W. E. PORTER.
DEMAND APPARATUS.
APPLICATION FILED AUG. 4, 1914.

1,138,787. Patented May 11, 1915.
2 SHEETS—SHEET 1.

Witnesses:

Inventor,
Willard E. Porter,
by
Att'y.

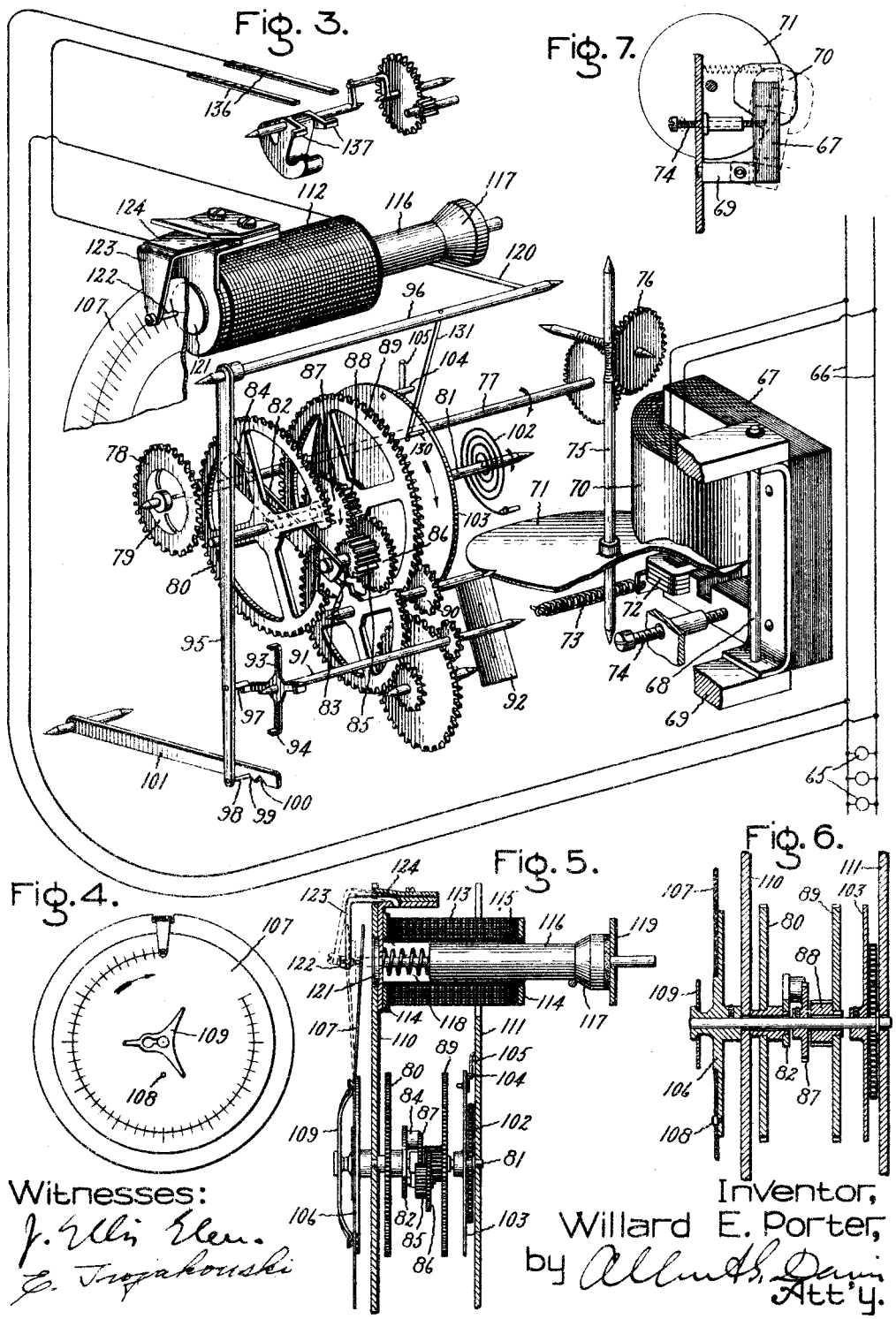

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

DEMAND APPARATUS.

1,138,787. Specification of Letters Patent. Patented May 11, 1915.

Application filed August 4, 1914. Serial No. 854,967.

*To all whom it may concern:*

Be it known that I, WILLARD E. PORTER, a citizen of the United States, residing at Lynn, in the county of Essex, State of Massachusetts, have invented certain new and useful Improvements in Demand Apparatus, of which the following is a specification.

My invention relates to demand apparatus, and in particular to apparatus which indicates the demand made by an electrical installation upon a central generating station or other source of electric energy supply.

Broadly, the object of my invention is to generally improve the present construction of demand apparatus.

More particularly the object of my invention is to provide a demand apparatus of simple and compact construction, accurate and reliable in operation, and adapted for continuous use with a minimum possibility of getting out of order.

Another object of my invention is to provide a satisfactory construction of demand apparatus in which no interrupting gear connections are present, and in which all operations are performed with minimum wear and tear of the apparatus.

A further object of my invention is to provide in a demand apparatus having a movable element intermittently returned to an initial position a novel and improved construction whereby the element is smoothly returned to its initial position, thus eliminating the possibility of establishing a false zero by rebounding of the element.

Other objects of my invention will be noted hereinafter.

The novel and patentable features which I believe to be characteristic of my invention are indicated in the claims appended hereto.

Figure 1:
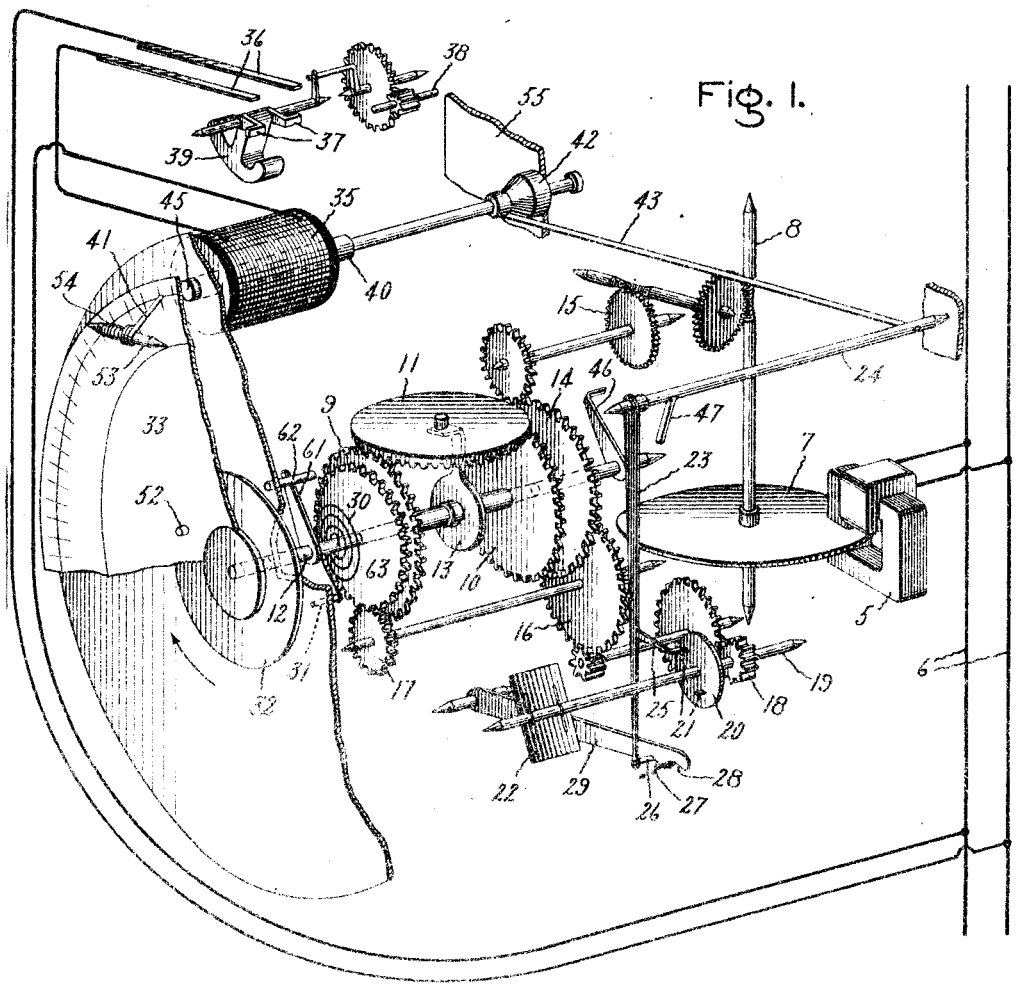
Figure 2:
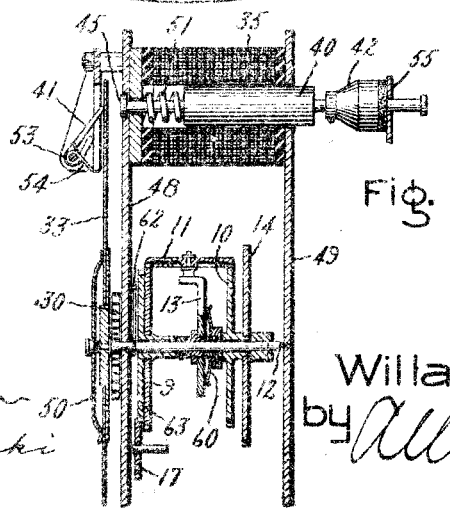

The construction and mode of operation of a demand apparatus embodying my invention will be understood by reference to the following description taken in connection with the accompanying drawings, in which:

Figure 1 is a diagrammatic view in perspective of one modification of my improved demand apparatus operatively connected to an electrical installation; Fig. 2 is a sectional elevation of a portion of the apparatus illustrated in Fig. 1; Fig. 3 is a diagrammatic view in perspective of another modification of my improved demand apparatus; and Figs. 4, 5, 6, and 7 are detail views of certain features of construction of the apparatus illustrated in Fig. 3.

I have illustrated my invention in connection with a demand apparatus which is adapted to record the times during which equal quantities of electric energy are metered. For purposes of illustration, I have shown an apparatus of this type having a time actuated record sheet which is returned to an initial position at the end of the metering of a predetermined quantity of electric energy. At the end of the metering of such quantity of energy, a mark is made on the record sheet to indicate the time required to meter this quantity or interval of energy. The minimum time in which any one of a number of such equal quantities of energy is metered is, obviously, a measure of the maximum demand.

Referring to Fig. 1 of the drawings, there is diagrammatically represented a constant speed motor having a motive element 5 connected across the mains 6 of an electric installation and a rotatably mounted disk armature 7 arranged within the influence of the motive element. The motive element 5 and disk armature 7 are of the well known shaded pole motor type, and are adapted to rotate a shaft 8 at substantially constant speed. It will, of course, be understood that any other constant speed mechanism, such as a clock movement, may be employed to drive the shaft 8.

A differential gearing comprising two gear members 9 and 10 and a planetary gear member 11 are operatively mounted upon a pivoted shaft 12. The gear members 9 and 10 are loosely mounted on this shaft, while the planetary gear 11 is resiliently secured to the shaft through an arm 13 and a slip clutch. A gear 14 is rigidly secured to the gear member 10, as will be best seen in Fig. 2 of the drawings, and is operatively connected through gearing 15 to the shaft 8. The gear member 10 of the differential gearing is thus continuously rotated at substantially constant speed. The connection of the planetary gear member 11 to the shaft 12 will be best understood by reference to Fig. 2. The planetary member is carried by an arm 13 loosely mounted on the shaft 12. A slip clutch tends normally to rotate the shaft 12 with the planetary member, but permits rotation of the planetary member when rotation of the shaft is prevented. This slip clutch comprises a spring washer 60 punched in the form of a spider and adapted to be secured to the shaft 12. The spring tension between the washer 60 and the arm 13 is sufficient to turn the shaft 12 against the influence of a spring 30, which returns the shaft to its initial position as hereinafter explained, and still weak enough to slip when further rotation of the shaft is prevented by the engagement of an arm 61, secured to the shaft, with a fixed stop 62.

A train of gears 16 of a decreasing gear ratio is operatively connected to the second gear member 9 of the differential gearing. A pinion 17 is the first member of the gear train 16 and is always in mesh with a gear 63 concentrically positioned and secured to the gear member 9. The last member of the gear train 16 is a pinion 18 secured to a rotatably mounted shaft 19. The shaft 19 carries a disk 20 having two lugs 21. An air damping vane 22 is also secured to the shaft 19.

A lever arm 23 is secured to a pivoted shaft 24 and is provided with a finger 25. The finger 25 is adapted to project into the path of movement of the lugs 21, and engaging with one of the lugs acts as a stop member preventing rotation of the disk 20 and hence of the gear member 9. When the finger occupies this position a pin 26 secured to one end of the lever arm 23 engages in a notch 27 of a pivoted arm 29 and securely holds the finger in its proper position. The arm 29 has a second notch 28 with which the pin 26 engages when the finger has been moved out of the path of movement of the lugs 21, as will be more fully described hereinafter.

A coil spring 30 is secured at one end to the shaft 12 and at the other end to a fixed part 31 of the apparatus. When energized this spring tends to rotate the shaft 12 in a direction opposite to the direction of rotation of the gear member 10. As previously explained, rotation of the gear member 9 is normally prevented because of the engagement of a lug 21 with the finger 25. Thus, continuous rotation of the gear member 10 will rotate the planetary member 11 and the shaft 12 operatively attached thereto in a forward direction, as indicated by the arrow in Fig. 1. A plate 32 is secured to the shaft 12 and is adapted to carry a removable record sheet or chart 33. Since the rotation of the gear member 10 is substantially uniform, it will be observed that the record sheet 33 moves in a forward direction at substantially uniform speed, or, in other words, is time actuated.

The rotation of the gear member 10 operates to wind up or energize the spring 30. As previously mentioned, the tendency of this spring when energized is to drive the shaft 12 and the record sheet 33, and hence the planetary member 11 in a backward direction. Since the gear member 9 is normally locked against rotation, the spring 30 is normally maintained inactive.

An electromagnet 35 of the solenoid type is arranged to be energized at intermittent intervals. In the apparatus illustrated in the drawings these intervals are equal quantities of metered energy. The circuit of the electromagnet 35 includes two fixed contact members 36 which are adapted to be bridged, to complete the circuit of and energize the winding of the magnet, by two coöperating movable contacts 37. The movable contacts 37 are adapted to be driven by an electric motor meter. To this end, the rotatable shaft 38 is operatively connected to the rotatable element of the meter. The movable contacts 37 are of the well known gravity type having an eccentrically arranged weight 39 which is slowly raised to its maximum height by the rotation of the shaft 38, and then responds to the action of gravity and falls, thus insuring a quick make and break between the contacts 36 and 37.

When the electromagnet 35 is energized, its plunger armature 40 is drawn forwardly, or toward the left as viewed in Fig. 2 of the drawings. A marking device comprising a resiliently mounted marking stylus 41 is operatively related to the record sheet 33, and when the armature 40 is drawn forwardly a record mark is made on the record sheet 33. A cam member 42 is secured to the shaft of the armature 40 and is arranged to depress one end of an arm 43 when the electromagnet is energized. The arm 43 is secured to the pivoted shaft 24, and when depressed by the cam member 42 operates to turn the shaft through a small angle and to move the finger 25 out of the path of movement of the lugs 21.

The operation of my improved demand apparatus is as follows: The gear member 10 is continuously rotated in a forward direction at substantially constant speed, while the gear member 9 is normally locked to prevent its rotation. The planetary gear member 11 will thus rotate in the same direction as the gear member 10, and through the spring clutch will rotate the shaft 12 and record sheet 33 at a substantially uniform rate. The rotation of the shaft 12 in a forward direction operates to wind up or energize the spring 30. When the electromagnet 35 is energized, at the end of the metering of a predetermined quantity of electric energy, the armature 40 is drawn within the electromagnet. The cam member 42 depresses the arm 43 and turns the shaft 24 until the finger 25 is moved out of engagement with the coöperating lug 21. The pin 26 now engages in the notch 28 and securely holds the lever arm 23 in its new position. The gear train 16 is thus unlocked, thereby permitting rotation of the gear member 9. The forward end of the armature shaft carries a hammer-like member 45 which is forced out toward the stylus 41 upon the energization of the electromagnet. The stylus being resiliently mounted is forced outwardly by the action of the member 45 whereby a short record mark is imparted on the record sheet. The record sheet is firmly held between the stylus and the member 41 while the electromagnet is energized. As soon as the electromagnet 35 is deenergized, the hammer member 45 is forced back to its initial position by a spring 51. The spring 30 now operates to rotate the shaft 12 and planetary gear member 11 in a backward direction. It will, of course, be understood that the rotation of the shaft 12 in response to the action of the spring 30 is relatively much faster than the rotation of the gear member 10. At this stage of the operation the gear member 10 acts, in effect, as if it were stationary, and the gear member 9 thus rotates in a backward direction due to the backward rotation of the planetary member 11 of the differential gearing. The gear member 9 drives the gear train 16 and the air damping vane 22, and its speed is thereby materially damped. This damping action insures a smooth and gradual backward movement of the record sheet, and eliminates any possibility of the record sheet rebounding when it reaches its initial position, with the resultant likelihood of establishing a false zero for the next interval of measurement. The shaft 12 carries an arm 46 which rotates therewith. A stop pin 47 secured to the shaft 24 is arranged in the path of movement of the arm 46. When the gear member 9 is unlocked and the shaft 12 responds to the action of the spring 30, the arm 46 rotates in a counter-clockwise direction, as viewed in Fig. 1 of the drawings, and strikes against the stop pin 47. The engagement of the arm 46 with the pin 47 arrests the rotation of the shaft 12 and also turns the shaft 24 through a small angle so that the finger 25 now projects into the path of movement of the lugs 21. A lug 21 will thus engage the finger 25, thereby again locking the gear train 16. The pin 26 now engages in the notch 27 whereby the finger 25 is securely held in the path of movement of the lugs 21. The engagement of the arm 46 with the pin 47 thus determines the initial position of the shaft 12 and hence of the record sheet 33. The apparatus is now in its initial condition, and the cycle of operations is repeated.

Reference to Fig. 2 of the drawings will indicate the arrangement of the differential gearing in the apparatus. It will be observed that the shaft 12 is supported between two parallel plates 48 and 49. The record sheet 33 has an aperture which is adapted to register with a pin 52 secured to the plate 32, thus accurately positioning the record sheet with respect to the plate. A spring element 50 properly holds the record sheet in operative engagement with the plate. The shaft of the armature 40 extends through an opening in the plate 48, and backward displacement of the armature is prevented by engagement of the cam member 42 with a fixed plate 55.

It will be noted that the gear member 10 is continuously rotated at a uniform rate by the constant speed driving mechanism, and that the planetary member 11 is likewise continuously rotated in a forward direction while the gear member 9 is maintained locked. If the consumption of energy is very small or zero, the record sheet will complete a revolution before the interval of energy has been metered. Under these circumstances, no record of the demand is desired, since it is abnormally small, and hence rotation of the record sheet is arrested when it has completed a full scale movement, and maintained in this position until such time as the interval of energy is metered. To this end a fixed stop 62 is arranged in the path of movement of an arm 61, and is adapted to prevent further rotation of the shaft 12 and record sheet 33 when the latter have moved from their respective initial positions substantially one revolution. The planetary member 11 continues to rotate at uniform speed due to the slip action of the spring clutch until the interval of energy has been metered and the electromagnet 35 energized as heretofore explained.

In Fig. 2 of the drawings, I have shown the arms 61 and 62 arranged on one side of the plate 48, and the spring 30 arranged on the other side of the plate, while in Fig. 1 I have shown these elements all arranged on the same side of the plate in order to make the illustration more easily understood. It will be obvious that other and various arrangements of these elements can be made without departing from the spirit of my invention. I have also shown a slip clutch between the planetary gear member 11 and the shaft 12, but it will be understood that this slip clutch can be introduced at any point between the record sheet carrier and the shaft 8. Modified forms of slip clutch will also be evident to those skilled in the art.

From the foregoing description it will be evident that the record sheet rotates in a forward direction at a uniform or constant speed, and is thus in effect time actuated. The angle through which the record sheet turns during the metering of a predetermined quantity of energy is a measure of the time required to meter this quantity of energy. A mark is made on the record sheet at the end of the metering of each equal quantity of energy, and the record sheet is then returned to its initial position. The minimum angle through which the record sheet turns during any one of the equal energy intervals of measurement is indicative of the maximum demand made by the installation upon its source of energy supply. I prefer to employ a record sheet of specially prepared paper which is adapted to have a mark imparted thereon by a stylus of brass or other suitable metallic material. The stylus 41 shown in Figs. 1 and 2 of the drawings comprises a metallic wire wound about a pivoted shaft 53 and resiliently held in contact with the record sheet by means of a spring 54. It will of course be understood, however, that any other suitable recording mechanism may be employed.

In Figs. 3, 4, 5, 6, and 7 I have shown a slightly modified construction of demand apparatus embodying my invention. The principle of operation of this modification is substantially identical with that of the modification illustrated in Figs. 1 and 2, the difference between the two modifications residing merely in certain details of construction and particularly in the form of the differential gearing employed. In order to reduce the thickness of the demand indicator, I have, in the modification about to be described, replaced the differential gearing shown in Figs. 1 and 2 by a train of gearing having a planetary member and producing a differential gearing action. The construction and mode of operation of the apparatus will be best understood by a brief description thereof.

An electrical installation having conductors 66 is diagrammatically represented as supplying electric energy to translating devices 65. An induction motor element of the shaded pole type is connected across the conductors 66. The induction motor element comprises a substantially rectangular core 67 of laminated magnetic material which is pivotally mounted on a rod 68 secured to a stationary frame 69. The magnetic core 67 carries a coil 70 which is connected across the conductors 66. The core 67 is provided with an air gap in which a disk armature 71 is mounted for rotary motion in the well understood manner. A portion of the lower pole member of the magnetic core carries a short circuiting coil 72, thus constituting the shading pole of the motor element. A spring 73 is secured at one end to a stationary part of the apparatus and at the other end to the core 67. A bolt 74 is screw-threaded in a stationary part of the apparatus and engages the core 67 and serves to limit the movement of the core in response to the action of the spring 73. It will thus be evident that the position of the core 67, and particularly the position of the pole pieces of the induction motor element, can be varied with respect to the disk 71 by means of the screw 74. The induction motor element is adapted to operate as a timing mechanism, and the construction above described enables an accurate adjustment of the speed of rotation of the disk 71.

A disk 71 is secured to a pivotally mounted shaft 75 and drives through gearing 76 a shaft 77. A gear 78 is loosely mounted on the shaft 77 but normally rotates therewith, due to the action of a resilient clutch device in the nature of a spring washer 79 which is rigidly secured to the shaft 77.

A gear 80 is loosely mounted on a shaft 81 and meshes with the gear 78. An arm 82 is rigidly secured to the gear 80 and has at one end a stub shaft 83 and at the other end a counter-balancing weight 84. A pinion 85 and a gear 86 rigidly secured to each other are loosely mounted on the stub shaft 83. The pinion 85 meshes with a gear 87 rigidly secured to the shaft 81, while the gear 86 meshes with a pinion 88 rigidly secured to a gear 89 and loosely mounted on the shaft 81. A pinion 90 meshes with the gear 89 and forms the first member of a gear train of decreasing gear ratio connecting the gear 89 to a pivotally mounted shaft 91. The shaft 91 carries at one end an air damping vane 92 and at the other end a spider member 93 having four lugs or projections 94.

A lever arm 95 is secured to a pivoted shaft 96 and is provided with a finger 97. The finger 97 is adapted to project into the path of movement of the lugs 94, and when in this position engages with one of the lugs 94 and thus acts as a stop member preventing rotation of the shaft 91 and hence of the gear 89. A pin 98 is secured to one end of the lever arm 95, and when the finger 97 projects into the path of movement of the lugs 94 this pin engages in a notch 99 of a pivoted arm 101 whereby the finger is securely held in the proper position. The arm 101 is provided with a second notch 100 in which the pin 98 engages when the finger 97 is moved out of the path of movement of the lugs 94.

The shaft 81 is pivotally mounted in plates 110 and 111 of the indicator and has operatively secured thereto a spring 102. The spring when energized operates to turn the shaft in a counterclockwise direction, as viewed from the front of the apparatus; that is, in a direction opposite to that indicated by the arrows in Figs. 3 and 4. A disk 103 is rigidly secured to the shaft 81 and carries a pin 104 which is adapted to engage with a stop 105, for a purpose hereinafter explained. A plate 106 is secured to the shaft 81 and is adapted to carry a removable record sheet 107. The record sheet is provided with an aperture which registers with a pin 108 carried by the plate 106 whereby the correct position of the record sheet with respect to the plate is conveniently determined. A spring clip 109 serves to properly secure the record sheet to the plate 106.

An electromagnet 112 of the solenoid type is arranged to be energized by the engagement of the movable contacts 137 with the fixed contacts 136. The movable contacts 137 are adapted to be driven by the rotatable shaft of an electric motor meter as described in connection with the apparatus of Figs. 1 and 2. The coil of the electromagnet 112 is wound upon an insulating tube 113 of paper or similar material. The ends of the tube 113 extend beyond the coil, and engaging in fixed plates 114 serve to support the electromagnet. Insulating washers 115 separate the ends of the coil from the plates 114.

The electromagnet has a plunger armature 116 provided with a conical cam member 117. A coil spring 118 within the insulating tube 113 normally maintains the armature in engagement with a fixed plate 119. An arm 120 secured to the shaft 96 is adapted to be depressed by the cam member 117 when the electromagnet is energized. A disk hammer-like head 121 is secured to the armature 116 and is adapted on the energization of the electromagnet to move into the dotted line position indicated in Fig. 5 of the drawings. A marking stylus 122 is positioned in front of the head 121 and is screw-threaded in an L-shaped member 123. A leaf spring 124 normally maintains the arm 123 and the marking stylus in the full line position indicated in Fig. 5 of the drawings. The record sheet 107 is arranged between the head 121 and the marking stylus 122, so that upon the energization of the electromagnet the record sheet will be pressed between the head and the marking stylus, and the marking stylus and arm 123 will be forced into the dotted line position indicated in Fig. 5, thereby imparting a short mark on the record sheet. As previously stated, the record sheet is preferably of specially prepared paper, which is adapted to have a distinctive mark imparted thereupon by a metallic stylus of brass or similar material.

The operation of the apparatus above described is as follows: The rotatable disk 71 of the substantially constant speed shaded pole motor drives the shaft 77 at a uniform speed. Rotation of the shaft 77 is transmitted to the gear 80 by means of the gear 78 and the spring washer clutch 79. As indicated in the drawings, the gear 80 will rotate counter-clockwise. The arm 82 and the pinion 85 and gear 86 carried thereby will likewise rotate counter-clockwise. Since the gear 89 is locked by the engagement of a lug 94 with the finger 97, the pinion 88 will be stationary, and the counter-clockwise movement of the arm 82 will cause the pinion 85 and gear 86 to rotate counter-clockwise about their common stub shaft 83, due to the operative connection between the fixed pinion 88 and the gear 86. Rotation of the pinion 85 about the stub shaft 83 causes the gear 87 to rotate in a clockwise direction. The gear 87 is secured to the shaft 81 so that its clockwise rotation moves the record sheet clockwise and also energizes the spring 102. The rotation of the disk 71 is thus transmitted to the record sheet and also caused to energize the spring 102. At the end of the metering of a predetermined energy interval, that is, when the meter shaft has completed a predetermined number of revolutions, the movable contacts 137 will engage the fixed contacts 136, thereby energizing the electromagnet 112. The plunger armature 116 is thereupon drawn within the electromagnet, and the disk hammer head 121 presses the record sheet against the marking stylus and forces the support for the marking stylus into the dotted line position of Fig. 5, thereby imparting a short record mark on the record sheet. The movement of the armature 116 within the electromagnet causes the cam 117 to depress the arm 120, thereby moving the finger 97 out of engagement with the lug 94. The gear 89 is thereupon unlocked. The energized spring 102 now tends to turn the shaft 81 in the opposite direction, that is, counter-clockwise. At this stage of the operation the gear 80, and hence the arm 82, may be considered as stationary. The spring 102 tends to rotate the shaft 81 and the gear 87 secured thereto at a relatively high speed. Since the arm 82 is relatively stationary, the pinion 85 and gear 86 tend to rotate about the stub shaft 83 at a relatively high speed. Rotation of the gear 86 is transmitted to the gear 89 and then through the connecting gear train to the shaft 91. The decreasing gear ratio of the gear train and the air damping vane 92 damp the rotation of the shaft 81 in response to the action of the spring 102, so that the shaft rotates smoothly and gradually. The disk 103 being secured to the shaft 81 rotates therewith. When the shaft rotates backwardly, or counter-clockwise, in response to the action of the spring 102, a pin 130 secured to the disk strikes an arm 131 secured to the pivoted shaft 96. The engagement of the pin 130 with the arm 131 operates to turn the shaft 96 and to move the finger 97 into the path of movement of the lugs 94. A lug 94 will now engage with the finger 97, and the gear 89 will be again locked, so that the apparatus is again in its initial condition, whereupon the cycle of operations is repeated.

The shaft 77 rotates continuously at constant speed, and hence if the consumption of energy is low or zero the shaft 81, and thus the record sheet 107, may make a complete revolution before the metering of the predetermined equal quantity of energy. For this reason the disk 103 carries the pin 104 which is adapted to engage with the fixed stop 105 when the disk has made nearly one complete revolution. Further rotation of the disk, and hence of the shaft 81 and of the gear 87, is thereby prevented. This locks the gear 80, and the spring washer clutch 79 is therefore provided so that the shaft 77 may rotate under such conditions without rotating the gear 78.

It will be evident from the foregoing description that the motion of the pinion 85 and gear 86 is planetary in its nature. That is, these members are carried about the shaft 81 as an axis, and, furthermore, rotate about their own axis. In principle, the operation of the pinion 85 and gear 86 is substantially the same as that of the operation of the planetary gear member 11 of the modification shown in Fig. 1. I have, therefore, employed the expression planetary member to cover a member adapted to have a planetary motion of a character similar to that of the planetary gear member 11 of Fig. 1 and the pinion 85 and gear 86 of Fig. 7.

It will be observed from the foregoing description and explantion that I have provided a demand apparatus of simple and compact construction. All of the operative elements of the apparatus are always directly connected with their coöperating elements, and there is no interrupting of gear connections to permit the return of the record sheet to its initial position. The movement of the record sheet in a backward direction to its initial position is smooth and gradual, due to the retarding action of the decreasing gear train and the damping vane. There is, therefore, no rebound of the record sheet when it reaches its initial position and consequent danger of establishing a false zero for the beginning of the next interval of demand measurement. Further, the wear and tear to the apparatus occasioned by the intermittent return of the record sheet to its initial position is a minimum, since there is no sudden and forceful striking of the record sheet against a fixed stop.

Numerous modifications in the details of construction of my improved demand apparatus will be evident to those skilled in the art.

While I have herein illustrated and described my invention in connection with a particular type of demand apparatus, it will be understood that the invention is in no sense limited to this type of apparatus, but is, on the other hand, adapted to be employed in various types of apparatus for measuring demand. I do not, therefore, desire to be limited to the specific constructions which I have herein illustrated and described by way of example, and I aim by the terms of the appended claims to cover all modifications within the spirit and scope of my invention.

What I claim as new and desire to secure by Letters Patent of the United States, is:—

1. In a demand apparatus, a planetary member operatively mounted on a rotatable shaft and adapted to drive the shaft in a forward direction, means adapted when energized to drive said shaft in a backward direction, and means for actuating said planetary member to drive said shaft in a forward direction and to simultaneously energize said last mentioned means.

2. In a demand apparatus, a train of gearing, a movable member operatively related to said gearing, means adapted when energized to move said member in a backward direction, means for damping the movement of said member in the backward direction, and means operatively related to said gearing for moving said member in a forward direction and for simultaneously energizing said first mentioned means.

3. In a demand apparatus, a rotatably mounted shaft, means adapted to rotate said shaft in a backward direction, gear member having a planetary movement adapted to rotate said shaft in a forward direction and to simultaneously energize said first mentioned means, and means whereby said shaft is intermittently permitted to respond to the action of the first mentioned means.

4. In a demand apparatus, a rotatably mounted shaft, means adapted to rotate said shaft in a backward direction, a gear member having a planetary movement adapted to rotate said shaft in a forward direction and to simultaneously energize said first mentioned means, means whereby said shaft is intermittently permitted to respond to the action of said first mentioned means, and means for damping the speed of rotation of said shaft when responding to the action of said first mentioned means.

5. In a demand apparatus, a train of gearing having a planetary member, a shaft adapted to be driven in a forward direction by said planetary member, means adapted when energized to drive said shaft in a backward direction, and means for actuating said planetary member to drive said shaft in a forward direction and to simultaneously energize said first mentioned means.

6. In a demand apparatus, a train of gearing having a planetary member, a shaft operatively connected to said planetary member, means adapted when energized to drive said shaft in one direction, means whereby said planetary member is adapted to drive said shaft in the opposite direction and to simultaneously energize said first mentioned means, means whereby said first mentioned means is normally maintained inactive, and means for intermittently releasing said last mentioned means to permit said first mentioned means to operate.

7. In a demand apparatus, a train of gearing having a planetary member, a shaft operatively connected to said planetary member, means adapted when energized to drive said shaft in one direction, means for actuating said planetary member to drive said shaft in the opposite direction and to simultaneously energize said first mentioned means, means whereby said first mentioned means operates at intermittent intervals to drive said shaft, and means for damping the speed of rotation of said shaft when driven by said first mentioned means.

8. In a demand apparatus, a train of gearing having a planetary member, a shaft operatively connected to said planetary member, means tending when energized to drive said shaft at a relatively rapid speed in one direction, means whereby said planetary member is adapted to drive said shaft at a relatively slow speed in the opposite direction and to simultaneously energize said first mentioned means, means whereby said first mentioned means is normally maintained inactive, means for intermittently releasing said last mentioned means to permit said first mentioned means to operate, and means for damping the speed of rotation of said shaft when driven by said first mentioned means.

9. In a demand apparatus, a train of gearing having a planetary member, a shaft operatively connected to said planetary member, means whereby said planetary member is adapted to drive said shaft at a relatively slow speed in one direction, means adapted to drive said shaft in the opposite direction at a relatively rapid speed, and means for damping the speed of rotation of said shaft when rotating in said opposite direction.

10. In a demand apparatus, a train of gearing including a plurality of gear members and a planetary member, a shaft operatively related to said planetary member, means adapted to drive said shaft in one direction, means whereby said planetary member is adapted to drive said shaft in the opposite direction, means for locking one of said gear members whereby said first mentioned means is maintained inactive, means for intermittently operating said locking means to unlock the gear member, and means operating to damp the speed of rotation of said shaft when the gear member is unlocked.

11. In a demand apparatus, a rotatably mounted shaft, a train of gearing including a plurality of gear members loosely mounted on said shaft and a planetary member adapted to rotate said shaft in a forward direction, driving means operatively connected to one of said gear members and adapted to actuate said planetary member to drive said shaft in a forward direction, a spring having one end secured to said shaft and the other end secured to a fixed point and adapted to be energized by the forward rotation of said shaft, means for locking another of said gear members against rotation whereby said shaft is prevented from responding to the influence of said spring, and means for intermittently operating said locking means to unlock the gear member.

12. In a demand apparatus, a rotatably mounted shaft having an initial position, a train of gearing including two gear members loosely mounted on said shaft and a planetary member adapted to rotate the shaft in a forward direction, means operatively connected to one of said gear members for actuating said planetary member to drive said shaft in a forward direction, means adapted to drive said shaft in a backward direction, a rotatable air damping vane, gearing operatively connecting said damping vane to said second gear member, locking means for preventing rotation of the second gear member whereby the backward driving means of said shaft is maintained inactive, and means whereby said locking means is intermittently released.

13. In a demand apparatus, a rotatably mounted shaft having an initial position, a train of gearing including two gear members loosely mounted on said shaft and a planetary member adapted to rotate the shaft in a forward direction, means operatively connected to one of said gear members for actuating said planetary member to drive said shaft in a forward direction, means adapted to drive said shaft in a backward direction, locking means for preventing rotation of the second gear member whereby said last mentioned means is maintained inactive, means for intermittently releasing said locking means whereby said shaft is permitted to move in a backward direction to its initial position, and means rotatable with said shaft for resetting said locking means in locking position when the shaft reaches its initial position.

14. In a demand apparatus, a time actuated record sheet having an initial position, a marking device operatively related to said record sheet, means adapted to return said record sheet to its initial position, means whereby said marking device is intermittently caused to make a mark on said record sheet and said last mentioned means operates to return the record sheet to its initial position after the mark is made, and means for damping the movement of said record sheet when returning to its initial position.

15. In a demand apparatus, a train of gearing including a planetary member, a movable element operatively connected to said planetary member, means for actuating said planetary member to move said element in a forward direction, means adapted to return said element to an initial position, and means for damping the movement of said element when returning to its initial position.

16. In a demand apparatus a train of gearing including a planetary member, a movable element operatively connected to said planetary member, means adapted when energized to move said element in a backward direction to an initial position, means for actuating said planetary member to move said element in a forward direction and to simultaneously energize said first mentioned means, and means whereby said first mentioned means operates at intermittent intervals to return the element to its initial position.

17. In a demand apparatus, a train of gearing including a planetary member, a movable element operatively connected to said planetary member, means adapted when energized to move said element in a backward direction to an initial position, means for actuating said planetary member to move said element in a forward direction and to simultaneously energize said first mentioned means, means whereby said first mentioned means operates at intermittent intervals to return said element to its initial position, and means for damping the movement of the element when returning to its initial position.

18. In a demand apparatus, a train of gearing including a planetary member, a record sheet operatively connected to said planetary member, means for actuating said planetary member to move said record sheet in a forward direction, means adapted to return said record sheet to an initial position, a marking device operatively related to said record sheet, and means whereby said marking device is intermittently caused to make a mark on said record sheet and the record sheet returned to its initial position each time a mark is made.

19. In a demand apparatus, a train of gearing including a planetary member, a record sheet operatively connected to said planetary member, means adapted when energized to move said record sheet in a backward direction to an initial position, means for actuating said planetary member to move said record sheet in a forward direction and to simultaneously energize said first mentioned means, a marking device operatively related to said record sheet, and means whereby said marking device is intermittently caused to make a mark on said record sheet and said first mentioned means operates to return the record sheet to its initial position after such mark has been made.

20. In a demand apparatus, a train of gearing including two gear members and a planetary member, a record sheet operatively related to said planetary member, means whereby one of said gear members actuates said planetary member to move said record sheet in a forward direction, means adapted to return said record sheet to an initial position, locking means for preventing rotation of the second gear member whereby said last mentioned means is maintained inactive, a marking device operatively related to said record sheet, means for intermittently actuating said marking device and for releasing said locking means to permit the record sheet to return to its initial position, and means for resetting said locking means in locking position when the record sheet has returned to its initial position.

21. In a demand apparatus, a rotatably mounted shaft, a train of gearing including two gear members loosely mounted on said shaft and a planetary member operatively connected to said shaft, means operatively connected to one of said gear members and adapted to actuate said planetary member to move said shaft in a forward direction, a record sheet operatively connected to said shaft, means operatively connected to said shaft and adapted to move it in a backward direction, locking means for preventing rotation of said second gear member whereby said last mentioned means is maintained inactive, a marking device operatively related to said record sheet, means for intermittently actuating said marking device and for releasing said locking means, and means for resetting said locking means in locking position when the record sheet has moved in a backward direction to an initial position.

In witness whereof, I have hereunto set my hand this thirtieth day of July, 1914.

WILLARD E. PORTER.

Witnesses:
JOHN A. McMANUS, Jr.,
ROBERT SHAND.